United States Patent [19]

Shapunov et al.

[11] 4,221,506

[45] Sep. 9, 1980

[54] PNEUMATIC CONVEYING APPARATUS FOR RELOADING BULK MATERIALS

[76] Inventors: Max M. Shapunov, ulitsa Frunze, 16, kv. 15; Mikhail A. Koppel, ulitsa Vostochnaya, 22, kv. 18; Felix M. Frumkin, ulitsa Prazhskaya, 34, kv. 93; Evgeny I. Zvenigorodsky, Vladimirsky prospekt, 11/10, kv. 15, all of Leningrad, U.S.S.R.

[21] Appl. No.: 880,063

[22] Filed: Feb. 22, 1978

[51] Int. Cl.$^2$ ............................................. B65G 53/66
[52] U.S. Cl. .......................................... 406/30; 406/115
[58] Field of Search ............... 302/21, 23, 33, 34, 302/35, 42, 58; 406/30, 113, 115

[56] References Cited

U.S. PATENT DOCUMENTS

| | | | |
|---|---|---|---|
| 2,880,036 | 3/1959 | Larsson et al. | 302/58 |
| 3,690,731 | 9/1972 | Mylting | 302/42 |
| 3,953,077 | 4/1976 | Kulyabko et al. | 302/58 |

FOREIGN PATENT DOCUMENTS 211385 4/1968 U.S.S.R. .................................. 302/58

Primary Examiner—Jeffrey V. Nase
Attorney, Agent, or Firm—Fleit & Jacobson

[57] ABSTRACT

A pneumatic conveying apparatus for reloading bulk materials, comprising a suction line formed by a vacuum pump connected to a settling chamber, and to an intaking nozzle, a discharge mechanism connected to the settling chamber, an electrically driven nozzle-transfer mechanism, and an electric drive controlling device. The electric drive controlling device constitutes a vacuum sensitive element connected into the suction line, while the electric drive of the nozzle-transfer mechanism being of a variable type, is supplied with a master switch, having its input mechanically linked to the output of the vacuum sensitive element.

1 Claim, 2 Drawing Figures

PNEUMATIC CONVEYING APPARATUS FOR RELOADING BULK MATERIALS

FIELD OF THE INVENTION

The present invention relates to the art of pneumatic conveyors, and more particularly to the pneumatic conveying apparatus for reloading bulk materials. The invention can most advantageously be used for unloading bulk materials from various vehicles, such as from cargo ships, as well as for reloading bulk materials.

BACKGROUND OF THE INVENTION

Known in the art is a pneumatic conveying apparatus for unloading cement carriers, comprising a suction line with a vacuum pump connected to a settling chamber and an intaking nozzle, a discharge mechanism, and an electrically driven nozzle-transfer mechanism (cf. "Handling Operations on Transport" by N. Sosunov et al, State Publishing House on Ferrous & Non-Ferrous Metallurgy, Moscow, 1962, pp. 83-84). In the apparatus, the electrically driven nozzle-transfer mechanism constitutes a manually operated electrical hoisting tackle. The uniform material intake, which is a controlling factor in a steady-state operation of the apparatus, cannot be achieved by an operator in charge of the hoisting tackle. A steady contact between the remotely-controlled and visually supervised intaking nozzle and the bulk material is hardly ever attained: now and then the nozzle buries too deep into the material, whereas at times the contact is lost altogether.

This disadvantage has been obviated in a pneumatic conveying apparatus for unloading bulk materials from railway cars (cf. USSR Inventor's Certificate No. 211,385), comprising a suction line formed by a vacuum pump connected to a settling chamber and to an intaking nozzle, a discharge mechanism connected to the settling chamber, and an electrically driven nozzle-transfer mechanism. The nozzle-transfer mechanism is designed as running wheels powered with an electric motor with a power switch. Placed ahead of the intaking nozzle is an electric drive controlling device made in the form of spring-loaded feelers kinematically linked to the power switch of the motor. For the conveyed material to be dilated, a screw conveyer is placed immediately upstream of the intaking nozzle. With the nozzle travelling, the feelers come into contact with the material to shift the feelers, shut down the motor and bring the nozzle to a stand-still in the event, wherein the density of the material is so high that the pressure exerted upon the feelers tends to become larger than the spring force. At the same time the screw conveyer keeps dilating the material until the density thereof is low enough to let the feelers restore their original position, whereupon the motor is started up and the intaking nozzle resumes its travel into the material.

Thus, in the prior art apparatus, a steady contact between the nozzle and the material is attained automatically. The intaking nozzle therewith travels at a constant speed, making occasional stops whenever the material density tends to build up in excess of a desired value.

It will be readily understood by those skilled in the art that ultimate conveying throughout requires some optimum concentration of the conveyed material in the air, depending upon both material characteristics and travelling speed of the intaking nozzle. Since the characteristics of the material, however, vary with the type thereof, transportation and storage conditions, humidity, etc. the optimum concentration of the material in the air can be maintained but by variations in the nozzle travelling speed.

The disadvantage of the prior arrangement consists in a constant travelling speed of the intaking nozzle with no regard to physical properties of the material conveyed, resulting in poor conveying throughput.

SUMMARY OF THE INVENTION

It is an object of the present invention to increase a throughput of the pneumatic conveying apparatus for reloading bulk materials by incorporating an automatic control of the intaking nozzle travelling speed in accordance with the conveyed material characteristics.

This object is accomplished by a pneumatic conveying apparatus for reloading bulk materials, comprising a suction line formed by a vacuum pump connected to a settling chamber, and to an intaking nozzle, a discharge mechanism connected to the settling chamber, an electrically driven nozzle-transfer mechanism and an electric drive controlling device, wherein, according to the invention, the electric drive controlling device constitutes a vacuum sensitive element connected into the suction line, while the electric drive of the nozzle-transfer mechanism, being of a variable type, is supplied with a master switch having its input mechanically linked to the output of the vacuum sensitive element.

The vacuum sensitive element utilized as an electric drive controlling device enables the drive rotational speed and hence the travelling speed of the intaking nozzle to be varied as a function of vacuum in the suction line, the latter being indicative of the conveyed material concentration in the air, whereby a higher throughput of the pneumatic conveying apparatus is attained. In so doing, the variable electric drive with the master switch ensures that the speed of the intaking nozzle should be controlled smoothly over a wide operational range.

The vacuum sensitive element is expedient to be of a diaphragm type with an adjustable-length rod which makes up the output thereof, the rod being attached to the diaphragm and having a pin. It is advisable likewise, that the input of the master switch should comprise a shaft with a lever mounted thereon and having a guide slot where the pin of the rod fits.

By adjusting the rod length of the vacuum sensitive element, the lever of the master switch is readily set into its initial position complying with an initial travelling speed of the intaking nozzle for a particular type of the material to be conveyed.

The invention will now be explained in greater detail with reference to an embodiment thereof, taken in conjunction with the accompanying drawings, wherein:

DETAILED DESCRIPTION OF THE PREFERRED EMBODIMENT

Figure 1:
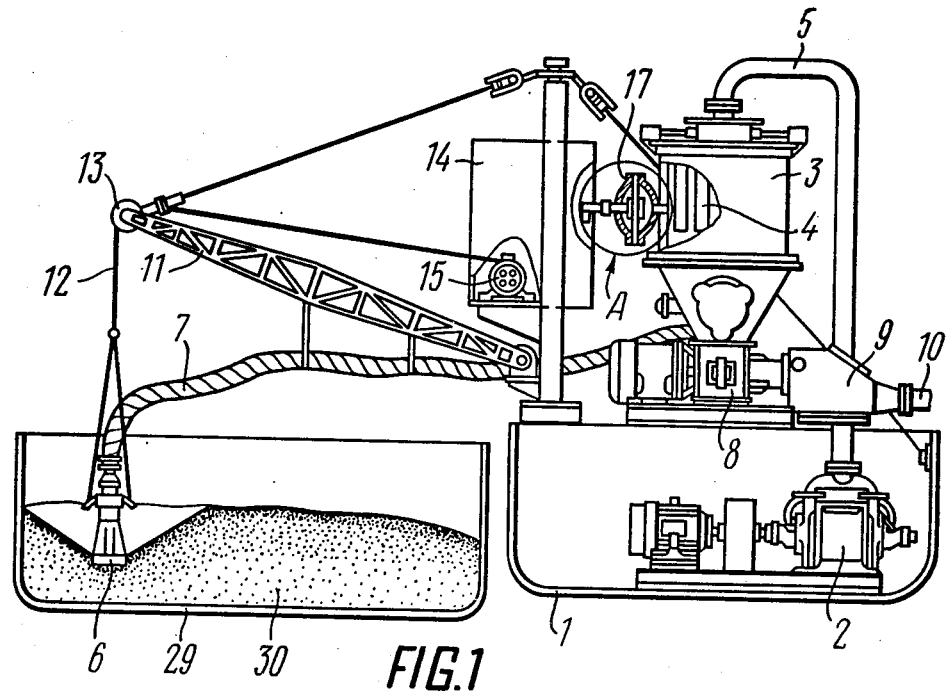
FIG. 1 is a fragmentary sectional view of a pneumatic conveying apparatus for reloading bulk materials, according to the invention.

The proposed pneumatic conveying apparatus is a suction-discharge apparatus mounted on a pontoon 1 (FIG. 1), for unloading bulk materials from freighters.

A suction line of the apparatus comprises a vacuum pump 2; a settling chamber 3 having filters 4 and connected to the vacuum pump 2 through a pipe 5, and an intaking nozzle 6 connected through a flexible hose 7 to the settling chamber 3. A discharge screw conveyer 8 arranged at the outlet of the settling chamber 3 links the suction line to a mixing chamber 9, the latter along with a delivery pipe 10 making up a discharge line of the apparatus. In the immediate vicinity to the settling chamber a slewing crane 11 is located that gives a support to the intaking nozzle 6. A nozzle-transfer mechanism consists of a lift rope 12 which passes over a pulley 13 of the crane 11, one end of the rope being fixed to the intaking nozzle 6 and the other end thereof wound around a load drum (not shown). The load drum (not shown) is connected to an electric drive 14. The drive 14, being of a variable type, comprises a variable-speed electric motor 15 and a master switch 16 (FIG. 2) electrically connected to the motor 15 (FIG. 1) to control the rotational speed thereof. The variable electric drives of the type in question are well known and covered comprehensively in the literature, that is why the drive 14 is represented but schematically, whereas both the design and circuit diagram of the master switch 16 (FIG. 2) connected to the electric motor 14 (FIG. 1) are neither discussed herein nor shown in the accompanying drawings.

To control the electric drive 14 (FIG. 1), a diaphragmtype vacuum sensitive element 17 is put into the suction line of the pneumatic conveying apparatus, namely, upon the settling chamber 3. A cavity 18 (FIG. 2) being an input of the vacuum sensitive element 17, is in communication through a sleeve 19 with the underfilter volume of the settling chamber 3. A cavity 20 of the vacuum sensitive element 17 is connected through a vent 21 with the ambient air. Serving as an output of the sensitive element 17, is a rod 22, one end thereof being attached to a diaphragm 23, the other one being provided with a pin 24.

A shaft 25 with a lever 26 mounted thereon and having a guide slot 27, where the pin 24 of the rod 22 fits, is in fact the input of the master switch 16.

To set the diaphragm 23 of the vacuum sensitive element 17 into position corresponding to no vacuum in the settling chamber 3, as well as to put the shaft 25 of the master switch 16 into the initial position consistent with the rated travelling speed of the intaking nozzle 6 (FIG. 6), the rod 22 (FIG. 2) is made of two parts disposed with a clearance between their end faces. The adjacent ends of these parts are threaded in the opposite sense to receive a nut 28, both ends thereof being threaded in the same sense as those of the rod 22. The nut 28 is intended to adjust the overall length of the rod 22.

The proposed pneumatic conveying apparatus operates as follows.

The travelling speed of the intaking nozzle 6 (FIG.1) is preset. This ensures the rated throughput of the apparatus for a specified concentration of the air-material mixture being an optimum value for a particular type and state of the material.

This travelling speed of the nozzle is in unambiguous correspondence with a certain position of the shaft 25 (FIG. 2) of the master switch 16. As a starting position, it is adjusted so that, rotating the nut 28, the clearance can be varied as required by a position of the diaphragm 23 of the vacuum sensitive element 17 consistent with the operating vacuum in the settling chamber 3 (FIG. 1).

The intaking nozzle 6 is inserted by the crane 11 into a freighter's hold 29 filled with a material 30 to be conveyed. The air-material mixture is entrained into the nozzle 6 lowered by the electric drive 14 of the nozzle-transfer mechanism, whereupon, due to the vacuum in the suction line, produced by the vacuum pump 2 connected to the inner volumes of the filters 4 of the settling chamber 3, the mixture is conveyed through the flexible hose 7 into the settling chamber 3. The air-material mixture is separated therein, whereupon the air is drawn through the cloth of the filters 4 by the vacuum pump 2, while the material 30 crumbles into the settling cone of the chamber 3. From the chamber 3 the material is unloaded by the screw conveyer 8 into the mixing chamber 9, whereupon after separation it is conveyed, due to the excessive pressure along the delivery pipe 10, to the point of discharge (not shown). A rated vacuum in the settling chamber 3 is maintained by the vacuum pump 2, that is why the position of the diaphragm 23 (FIG. 2) strained under a pressure gradient on the faces thereof, the location of the rod 22 linked to the diaphragm 23, and that of the lever 26, are stable, which ensures a stable starting position of the shaft 25. In so doing, the material 30 (FIG. 1) is fed into the intaking nozzle 6, with the nozzle travelling at a constant speed equal to the rated value.

In case, e.g., the bulk mass of the material 30 increased, the air-material mixture concentration starts rising, whereupon the vacuum in the suction line tends to grow to exceed the rated value. As a result, the pressure gradient over the diaphragm 23 (FIG. 2) of the vacuum sensitive element 17 goes up, and the diaphragm 23 aquires some extra strain, shown by broken lines in FIG. 2. With the diaphragm 23 strained the rod 22 makes a rightward linear shift. The lever 26 therewith causes the shaft 25 of the master switch 16 to turn in a clockwise direction. As compared to the rated travelling speed of the intaking nozzle 6, a new, lower speed corresponds to the position of the strained diaphragm, shown in FIG. 1 by broken lines. The travelling speed of the intaking nozzle 6 keeps going down until the concentration of the material 30 is so low, that the vacuum in the settling chamber 3 falls down, whereby the material 30 is taken into the nozzle 6 at a lower travelling speed than before.

Figure 2:
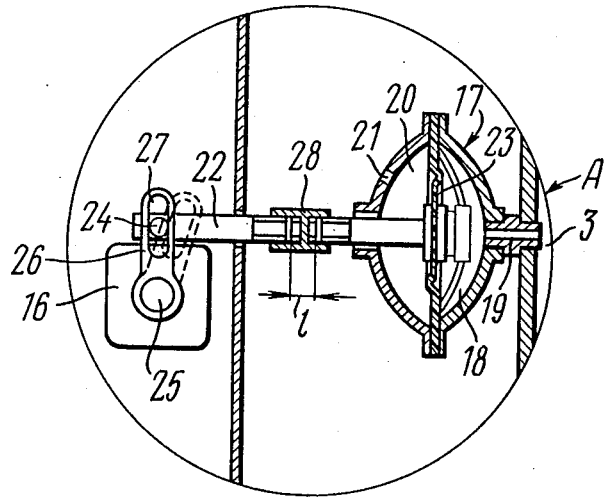
FIG. 2 is a blowup view of the assembly A of the apparatus shown in FIG. 1.

When in the suction line, vacuum is decreased, e.g. due to the lower bulk mass of the material 30, the smaller strain of the diaphragm 23 (FIG. 2), accompanied by a leftward linear shift of the rod 22, results automatically likewise in higher travelling speed of the intaking nozzle 6 (FIG. 1).

The proposed invention ensures a significantly higher throughput of the apparatus with no additional power consumed, lower-cost handling operations, shorter reloading times for cargo ships as well as better working conditions for operators.

It is to be understood that the form of the invention herewith described, is to be taken as a preferred embodiment, and that various changes and modifications thereof may be resorted to, without departing from the invention, or the scope of the claims below.

What is claimed is:

1. A pneumatic conveying apparatus for reloading bulk materials, comprising:
   a suction line for entraining said bulk materials;
   an intaking nozzle of said suction line;

a settling chamber of said suction line, connected to said intaking nozzle;

a vacuum pump of said suction line, connected to said settling chamber;

a discharge means for discharging said bulk materials from said settling chamber;

a nozzle-transfer means for moving said nozzle;

a variable electric drive of said nozzle-transfer means;

a variable-speed electric motor of said variable electric drive;

a variable master switch means connected to said electric drive, for governing the rotational speed of said electric motor; and a vacuum sensitive element with its input connected to said suction line, its output being mechanically linked to the input of said variable master switch;

wherein said vacuum sensitive element comprises a diaphragm, an adjustable-length rod attached to said diaphragm and having a pin, said rod making up the output of said vacuum sensitive element, and said master switch comprising a shaft being the output of said master switch, and a lever, mounted on said shaft and having a guide slot, said pin of said rod fitting in said guide slot of said lever, whereby the travelling speed of said intaking nozzle is controlled as a function of vacuum in said suction line.

* * * * *